United States Patent
Shin et al.

(10) Patent No.: US 8,451,415 B2
(45) Date of Patent: May 28, 2013

(54) METHOD OF FABRICATING LIQUID CRYSTAL DISPLAY DEVICE

(75) Inventors: Sang-mun Shin, Gyeonggi-do (KR); Jong-sik Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 840 days.

(21) Appl. No.: 12/630,369

(22) Filed: Dec. 3, 2009

(65) Prior Publication Data

US 2010/0159782 A1 Jun. 24, 2010

(30) Foreign Application Priority Data

Dec. 23, 2008 (KR) .................. 10-2008-0132543

(51) Int. Cl.
*G02F 1/1335* (2006.01)
*G02F 1/1345* (2006.01)

(52) U.S. Cl.
USPC ............................................ 349/150; 349/96

(58) Field of Classification Search
USPC .................................................. 349/96, 150
See application file for complete search history.

(56) References Cited

U.S. PATENT DOCUMENTS

| 2003/0123013 | A1* | 7/2003 | Han et al. | 349/149 |
| 2005/0117217 | A1* | 6/2005 | Yamaoka et al. | 359/483 |
| 2005/0174526 | A1* | 8/2005 | Yu | 349/187 |

FOREIGN PATENT DOCUMENTS

| JP | 07036005 A | * | 2/1995 |
| JP | 07283092 A | * | 10/1995 |

* cited by examiner

*Primary Examiner* — Huyen Ngo

(74) *Attorney, Agent, or Firm* — Morgan, Lewis & Bockius LLP

(57) ABSTRACT

A method of fabricating a liquid crystal display device includes: a first step of attaching a polarizing plate to an outer surface of a liquid crystal panel; a second step of attaching a tape carrier package (TCP) to the liquid crystal panel; a third step of coating a resin onto a rear surface of the TCP and a connection portion of the liquid crystal panel and the TCP; a fourth step of inspecting the TCP and the liquid crystal display panel; a fifth step of inserting the liquid crystal panel into a transferring means; a sixth step of transferring the transferring means; a seventh step of extracting the liquid crystal panel from the transferring means; a eighth step of attaching the TCP to a printed circuit board (PCB); a ninth step of inspecting the PCB, the TCP and the liquid crystal panel; and a tenth step of assembling the liquid crystal panel and a backlight unit with a plurality of frames.

12 Claims, 5 Drawing Sheets

METHOD OF FABRICATING LIQUID CRYSTAL DISPLAY DEVICE

This application claims the benefit of Korean Patent Application No. 10-2008-0132543, filed in Korea on Dec. 23, 2008, which is hereby incorporated by reference in its entirety.

BACKGROUND OF THE INVENTION

1. Field of the Invention

The present application relates to a method of fabricating a liquid crystal display device, and more particularly, to a method of fabricating a liquid crystal display device having a liquid crystal panel, a printed circuit board and a tap carrier package.

2. Discussion of the Related Art

As information age progresses, flat panel display (FPD) devices having light weight, thin profile, and low power consumption have been substituted for cathode ray tube (CRT) devices. Liquid crystal display (LCD) devices, plasma display panel (PDP) devices, field emission display (FED) devices, and electroluminescent display (ELD) devices are examples of the FPD devices. Since the LCD devices have excellent characteristics of high resolution, high contrast ratio and displaying moving images, the LCD devices have been widely used in a notebook computer, a monitor and a television.

In general, an LCD device includes a driving circuit unit that generates a gate signal, a data signal and a control signal using an image signal from an external system and supplies a power, a liquid crystal panel that displays images using the gate signal, the data signal and the control signal, and a backlight unit that supplies a light to the liquid crystal panel.

For example, the driving circuit unit includes a printed circuit board (PCB), where circuits generating RGB data and control signals using the image signal and a clock signal of the external system are formed, and a tape carrier package (TCP), where circuits generating the gate signal and the data signal using the RGB data and the control signals are formed. The PCB is connected to the liquid crystal panel through the TCP. The liquid crystal panel includes a first substrate having a pixel electrode, a second substrate having a common electrode and a liquid crystal layer. The first and second substrates face and are spaced apart from each other and the liquid crystal layer is interposed between the first and second substrates. The transmittance of the liquid crystal layer is changed according to the electric field generated between the pixel electrode and the common electrode to display the images. The backlight unit is disposed under the liquid crystal panel as a light source of the LCD device.

The LCD device is completed by modularizing the driving circuit unit, the liquid crystal panel and the backlight unit with a top frame, a main frame and a bottom frame. The steps of attaching the driving circuit unit such as the PCB and the TCP to the liquid crystal panel and wrapping the driving circuit unit, the liquid crystal panel and the backlight unit with the top, main and bottom frames may be referred to as a module process.

FIG. 1 is a view showing a method of fabricating a liquid crystal display device according to the related art.

In FIG. 1, a liquid crystal panel is fabricated through a panel process line 100. In a module process line 200, a tape carrier package (TCP) and a printed circuit board (PCB) are attached to the liquid crystal panel, and the liquid crystal panel, the TCP, the PCB and a backlight unit are assembled using a top frame, a main frame and a bottom frame, thereby a liquid crystal display (LCD) device completed.

In a liquid crystal injection apparatus 110, a liquid crystal layer is formed between a first substrate having a gate line, a data line, a thin film transistor (TFT) and a pixel electrode and a second substrate having a color filter layer, a black matrix and a common electrode, thereby the liquid crystal panel completed. The completed liquid crystal panel in the liquid crystal injection apparatus 110 is transferred to an auto probe apparatus 120. Defects of the liquid crystal panel such as an electric shortage or an electric disconnection in the gate line and the data line are inspected in the auto probe apparatus 120.

The liquid crystal panel passing the inspection of defects in the auto probe apparatus 120 is transferred to a polarizing plate attachment apparatus 210 in the module process line 200. In the polarizing plate attachment apparatus 210, a polarizing plate is attached to each of outer surfaces of the first and second substrates. Next, the liquid crystal panel having the polarizing plate is transferred to a tape automated bonding (TAB) apparatus 220 and the TCP is attached to each of adjacent side portions of the liquid crystal panel in the TAB apparatus 220. Next, the liquid crystal panel having the TCP is transferred to a PCB bonding apparatus 230 and the TCP is bonded to the PCB in the PCB bonding apparatus 230. Next, the liquid crystal panel having the TCP and the PCB is transferred to a resin coating apparatus 240. In the resin coating apparatus 240, a resin is coated onto connection portions of the liquid crystal panel and the TCP and of the TCP and the PCB and then the resin is cured.

Next, the liquid crystal panel is transferred to a driving circuit unit inspection apparatus 250 and defects in the TCP and the PCB are inspected in the driving circuit unit inspection apparatus 250. Next, the liquid crystal panel passing the inspection of defects in the driving circuit unit inspection apparatus 250 is transferred to a frame assembling apparatus 260. In the frame assembling apparatus 260, the top, main and bottom frames wrap the liquid crystal panel, the TCP, the PCB and the backlight unit so that the LCD device can be completed.

The panel process line 100 where the liquid crystal panel is fabricated has a different degree of cleanliness from the module process line 200 where the TCP and the PCB are connected to the liquid crystal panel. Since particles definitely deteriorate fine patterns such as the gate line, the data line and the TFT, the panel process line 100 may have a relatively high degree of cleanliness. In addition, since the particles seldom deteriorate the electric connections between large-sized patterns such as pads of the liquid crystal panel, the TCP and the PCB, the module process line 200 may have a medium degree of cleanliness for reduction in maintenance cost. For example, the panel process line 100 may have a first degree of cleanliness of class 1000 and the module process line 200 may have a second degree of cleanliness within a range of class 1000 to class 10000. Here, the class (ea/feet$^3$) may be defined by the number of particles having a diameter over 0.5 μm in one cubic feet. In addition, the first degree of cleanliness of class 1000 may be defined to be higher than the second degree of cleanliness within a range of class 1000 to class 10000.

All the steps performed in the module process line 200 do not require the second degree of cleanliness, and some steps may be performed without reduction in process yield even under a degree of cleanliness lower than the second degree of cleanliness. However, since the steps in the module process line 200 may hardly be divided, production cost and fabrication time increase due to excessive maintenance cost for some steps.

SUMMARY OF THE INVENTION

Accordingly, embodiments of the invention are directed to a method of fabricating a liquid crystal display device that substantially obviates one or more of problems due to limitations and disadvantages of the related art.

An advantage of the invention is to provide a method of fabricating a liquid crystal display device where production cost and fabrication time are reduced by performing steps for a module process under different degrees of cleanliness.

Another advantage of the invention is to provide a method of fabricating a liquid crystal display device where reduction in process yield is prevented by transferring a liquid crystal panel between steps for a module process without contamination.

Another advantage of the invention is to provide a method of fabricating a liquid crystal display device where fabrication efficiency is improved by connecting a plurality of apparatuses for a module process as in-line type.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, according to an aspect of the invention, a method of fabricating a liquid crystal display device includes: a first step of attaching a polarizing plate to an outer surface of a liquid crystal panel; a second step of attaching a tape carrier package (TCP) to the liquid crystal panel; a third step of coating a resin onto a rear surface of the TCP and a connection portion of the liquid crystal panel and the TCP; a fourth step of inspecting the TCP and the liquid crystal display panel; a fifth step of inserting the liquid crystal panel into a transferring means; a sixth step of transferring the transferring means; a seventh step of extracting the liquid crystal panel from the transferring means; a eighth step of attaching the TCP to a printed circuit board (PCB); a ninth step of inspecting the PCB, the TCP and the liquid crystal panel; and a tenth step of assembling the liquid crystal panel and a backlight unit with a plurality of frames.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the illustrated embodiments of the present invention, which are illustrated in the accompanying drawings.

Figure 1:
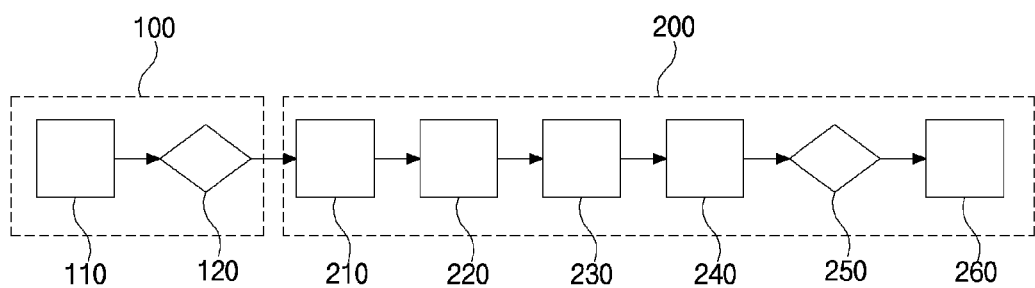
FIG. 1 is a view showing a method of fabricating a liquid crystal display device according to the related art.
Figure 2:
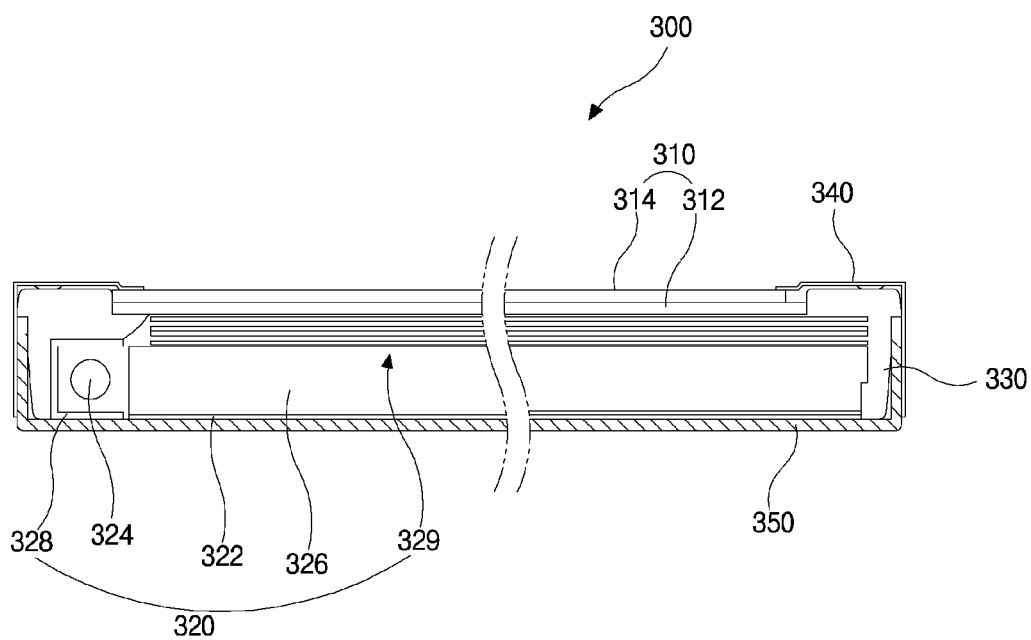
FIG. 2 is a cross-sectional view showing a liquid crystal display device according to the present invention.
Figure 3:
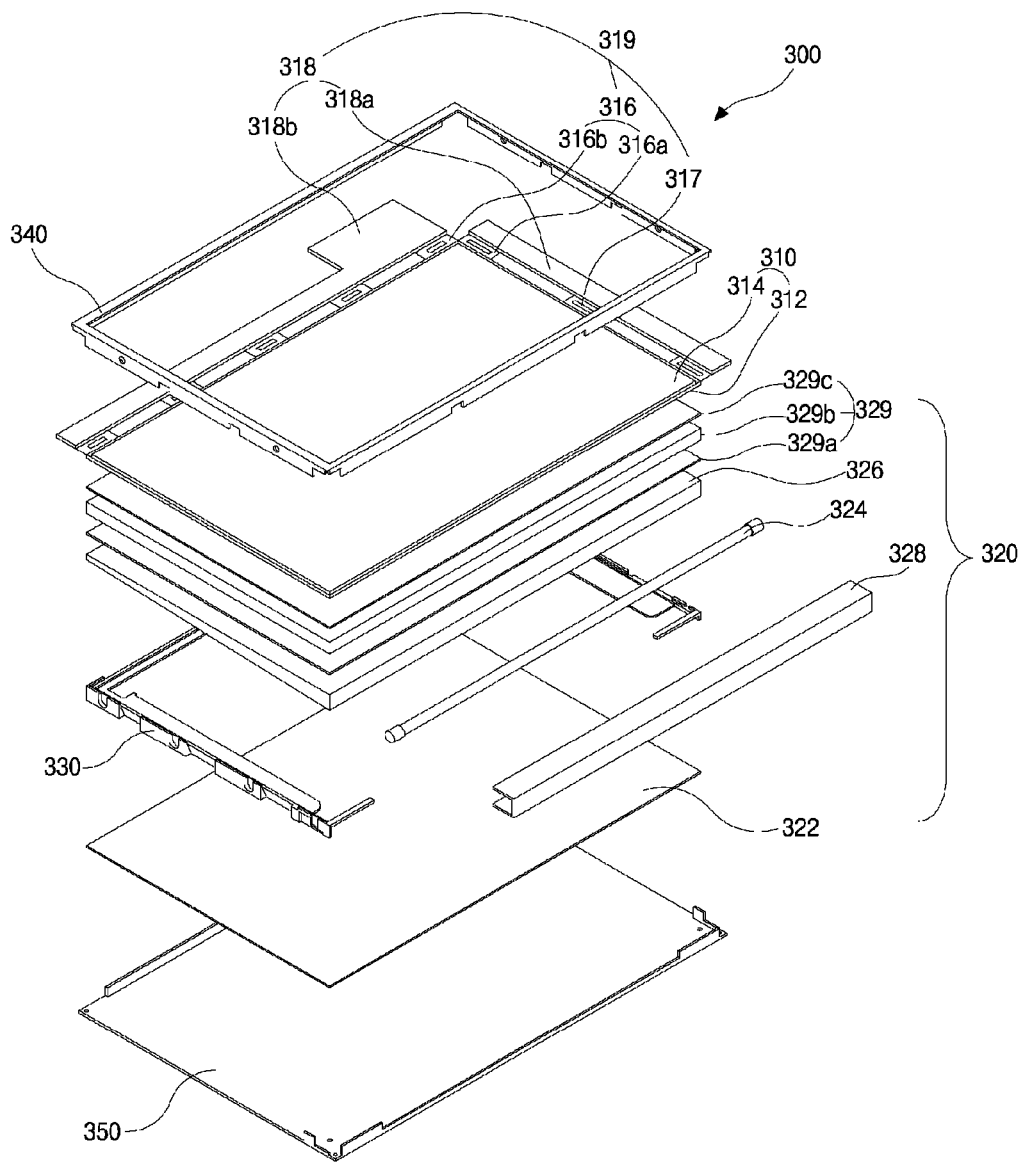
FIG. 3 is an exploded perspective view showing a liquid crystal display device according to the present invention.

FIG. 2 is a cross-sectional view showing a liquid crystal display device according to the present invention, and FIG. 3 is an exploded perspective view showing a liquid crystal display device according to the present invention.

In FIGS. 2 and 3, a liquid crystal display device 300 includes a liquid crystal panel 310, a driving circuit unit 319, a backlight unit 320, a main frame 330, a top frame 340 and a bottom frame 350. The liquid crystal panel 310 that displays images includes a first substrate 312, a second substrate 314 facing and spaced apart from the first substrate 312 and a liquid crystal layer (not shown) between the first and second substrate 312 and 314. The first and second substrates 312 and 314 may be referred to as an array substrate and a color filter substrate, respectively. Although not shown in FIGS. 2 and 3, a gate line, a data line, a thin film transistor (TFT) and a pixel electrode are formed on an inner surface of the first substrate 312. The gate line and the data line cross each other to define a pixel region. The TFT is connected to the gate line and the data line, and the pixel electrode is connected to the TFT. In addition, a color filter layer, a black matrix and a common electrode are formed on an inner surface of the second substrate 314. The color filter layer includes red, green and blue color filters each corresponding to the pixel region, and the black matrix corresponds to the gate line, the data line and the TFT. The common electrode covers the color filter layer and the black matrix.

The driving circuit unit 319 includes a tape carrier package (TCP) 316, a driving integrated circuit (IC) 317 on the TCP 316 and a printed circuit board (PCB) 318 connected to the liquid crystal panel 310 through the TCP 316. In another embodiment, the PCB may be connected to the liquid crystal panel through a flexible printed circuit (FPC). The TCP 316 includes a gate TCP 316a and a data TCP 316b, and the PCB includes a gate PCB 318a and a data PCB 318b. One end portion of the gate TCP 316a is attached to a first edge portion of the liquid crystal panel 310 and the other end portion of the gate TCP 316a is attached to the gate PCB 318a. In addition, one end portion of the data TCP 316b is attached to a second edge portion adjacent to the first side portion of the liquid crystal panel 310 and the other end portion of the data TCP 316b is attached to the data PCB 318b. After the TCP 316 and the PCB 318 are connected to the liquid crystal panel 310, the TCP 316 is bent such that the PCB is disposed at a side surface of the main frame 330 or under a rear surface of the bottom frame 350 in a module process.

The PCB 318 generates RGB data and a plurality of control signals, which are supplied to the driving IC 317 of the TCP 316, and the driving IC 317 generates a gate signal and a data signal, which is supplied to the gate line and the data line, respectively, of the liquid crystal panel 310. In another embodiment, the LCD device may have a single PCB generating RGB data and a plurality of control signals, and the liquid crystal panel may have an additional line for transmitting the RGB data and the plurality of control signals. Although not shown in FIGS. 2 and 3, an alignment layer is formed on each of top surfaces of the first and second substrates 312 and 314 to contact the liquid crystal layer, and a seal pattern is formed at a boundary portion between the first and second substrates 312 and 314. Further, a polarizing plate may be formed on each of outer surfaces of the first and second substrates 312 and 314.

The back light unit 320 that supplies light to the liquid crystal panel 310 is disposed under the liquid crystal panel 310. The back light unit 320 includes a lamp 324, a reflecting plate 322 having a white color or a silver color, a light guide plate 326 and an optic sheet 329. The lamp 324 is disposed at a side portion of the main frame 330. The reflecting plate 322, the light guide plate 326 and the optic sheet 326 are sequentially disposed over the bottom frame 350. The backlight unit 320 may further include a lamp guide 328 surrounding the lamp 324. The lamp guide 328 may include upper, side and lower surfaces and an opening facing the light guide plate 326 to protect the lamp 328 and improve light efficiency by reflecting light toward the light guide plate 326. The lamp guide 328 may be integrated into the reflecting plate 322 in another embodiment.

The lamp 324 may include one of cold cathode fluorescent lamp (CCFL) and an external electrode fluorescent lamp (EEFL). The light from the lamp 324 passes through the light guide plate 326 to be uniformly diffused in the light guide plate 326 due to total reflection and is outputted from an upper surface of the light guide plate 326 to the liquid crystal panel 310 as a planar light. In addition, the light guide plate 32 may include specific patterns at an upper or a lower surface thereof to provide a uniform planar light. The light outputted from the lower surface of the light guide plate 326 is reflected by the reflecting plate 322 under the light guide plate 326 toward the liquid crystal panel 310 to improve light efficiency.

The optic sheet 329 may include a diffusing sheet 329a, a prism sheet 329b and a protecting sheet 329c. The diffusing sheet 329a directly over the light guide plate 326 disperses light from the light guide plate 326 and the prism sheet 329b over the diffusing sheet 329a collects the dispersed light. The protecting sheet 329c protects the prism sheet 329b. Accordingly, the light passing through the optic sheet 329 normally enters the liquid crystal panel 310 with a uniform brightness distribution.

As a result, the light emitted from the lamp 324 is concentrated by the lamp guide 328 and enters the light guide plate 326. Next, the light is refracted toward the liquid crystal panel 310 in the light guide plate 326 and is processed through the optic sheet 329 to have a uniform brightness distribution. Finally, the liquid crystal panel 310 displays images using the light.

The liquid crystal panel 310, the driving circuit unit 319 and the backlight unit 329 are assemble with the main, top and bottom frames 330, 340 and 350. The bottom frame 350 has a rectangular plate shape with edge portions thereof bent upwardly, and the liquid crystal panel 310 and the backlight unit 329 are sequentially disposed over the bottom frame 350. The top frame 340 covers front edge surfaces of the liquid crystal panel 310. The main frame 330 having a rectangular open ring shape surrounds side surfaces of the liquid crystal panel 310 and the backlight unit 320. The main frame 330 is combined with the top and bottom frames 340 and 350 to wrap the liquid crystal panel 310, the driving circuit unit 319 and the backlight unit 329, thereby the LCD device 300 completed. The top frame 340 may be referred to as a top cover, a case top or a top case, the main frame 330 may be referred to as a support main, a guide panel, a main supporter or a mold frame, and the bottom frame 350 may be referred to as a cover bottom, a bottom cover or a lower cover. In another embodiment, the liquid crystal panel, the driving circuit unit and the backlight unit may be assembled with a plurality of frames, and the number of the plurality of frames may be varied.

Figure 4:
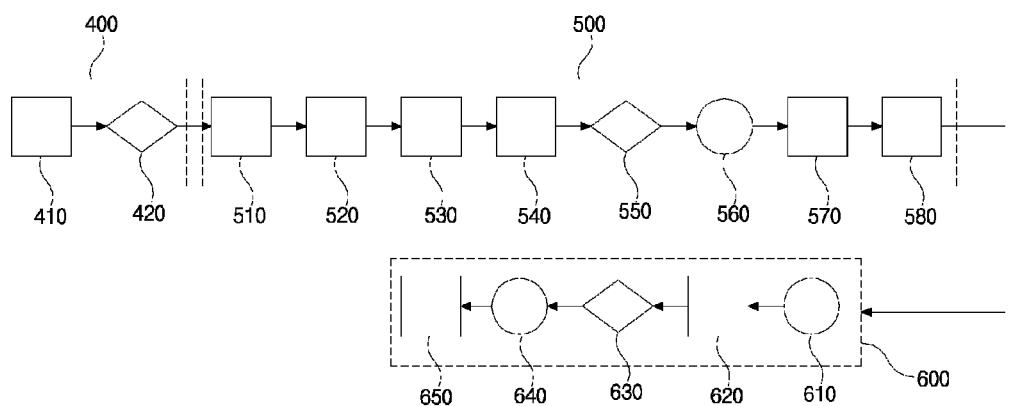
FIG. 4 is a view showing a method of fabricating a liquid crystal display device according to an embodiment of the present invention.

FIG. 4 is a view showing a method of fabricating a liquid crystal display device according to an embodiment of the present invention.

In FIG. 4, a liquid crystal panel 310 (of FIG. 3) is fabricated through a panel process line 400 having a first degree of cleanliness, a tape carrier package (TCP) 316 (of FIG. 3) is attached to the liquid crystal panel 310 through a first module process line 500 having a second degree of cleanliness. In addition, the TCP 316 is attached to a printed circuit board (PCB) 318 (of FIG. 3) and the liquid crystal panel 310 having a driving circuit unit 319 (of FIG. 3) such as the TCP 316 and the PCB 318 and a backlight unit 320 (of FIG. 3) are assembled with main, top and bottom frames 330, 340, 350 (of FIG. 3) through a second module process line 600 having a third degree of cleanliness, thereby a liquid crystal display (LCD) device 300 (of FIG. 3) completed.

In the panel process line 400, a first substrate 312 (of FIG. 3) having a gate line, a data line, a thin film transistor (TFT) and a pixel electrode and a second substrate 314 (of FIG. 3) having a black matrix, a color filter layer and a common electrode are attached to face and be spaced apart from each other. Further, in a liquid crystal injection apparatus 410 of the panel process line 400, a liquid crystal material is injected to form a liquid crystal layer between the first and second substrates 312 and 314, thereby the liquid crystal panel completed. The liquid crystal panel is transferred to an auto probe apparatus 420 and defects of the liquid crystal panel such as an electric shortage or an electric disconnection in the gate line and the data line are inspected in the auto probe apparatus 420.

In another embodiment, the liquid crystal layer may be formed by a dispensing method, where the first and second substrates are attached after the liquid crystal layer is formed on one of the first and second substrates. The liquid crystal panel is completed by cutting the attached first and second substrates including the liquid crystal layer.

Since the gate line, the data line, the TFT, the pixel electrode, the black matrix, the color filter layer and the common electrode have relatively fine patterns that exemplary having a width smaller than about 100 m, the panel process line 400 where the liquid crystal injection apparatus 410 and the auto probe apparatus 420 are constituted has a relatively high degree of cleanliness as the first degree of cleanliness. For example, the first degree of cleanliness may be higher than a degree of cleanliness of class 1000. The class (ea/feet3) may be defined by the number of particles having a diameter over 0.5 m in one cubic feet. Further, as the degree of cleanliness becomes higher, the number of class is defined become smaller.

The liquid crystal panel 310 passing the inspection of defects in the auto probe apparatus 420 is transferred to a first polarizing plate attachment apparatus 510 in the first module process line 500. In the polarizing plate attachment apparatus 510, a polarizing plate is attached to each of outer surfaces of the first and second substrates 312 and 314. Although not shown in FIG. 4, the liquid crystal panel 310 may be cleaned in a cleaning apparatus before the polarizing plate is attached.

Next, the liquid crystal panel 310 having the polarizing plate is transferred to a tape automated bonding (TAB) apparatus 520, and the TCP 316 is attached to each of adjacent side portions of the liquid crystal panel 310 in the TAB apparatus 520. The TCP 316 including a driving integrated circuit (IC) 317 (of FIG. 3) thereon is attached to a pad (not shown) in an portion of the first substrate 312 exposed by the second substrate 314 with an anisotropic conductive film (ACF) in a tape automated bonding (TAB) step. The ACF has a tape shape including a heat curable resin and conductive balls dispersed in the heat curable resin. When heat and force are applied to the ACF, the heat curable resin is hardened and the conductive balls are pressurized along one direction. As a result, two objects attached to the ACF are electrically connected to each other along the one direction. For example, after the ACF is disposed on the pad of the first substrate 312 and a first pad (not shown) of the TCP 316 is disposed on the ACF such that the first pad of the TCP 316 is aligned to the pad of the first substrate 312, the TCP 316, the ACF and the liquid crystal panel 310 are pre-attached with a lower pressure and a lower temperature. Then, the TCP 316, the ACF and the liquid crystal panel 310 are attached to each other with a higher pressure and a higher temperature, thereby the step of attaching the TCP 316 to the liquid crystal panel 310 in the TAB apparatus 520 completed.

Next, the liquid crystal panel having the TCP 316 is transferred to a first resin coating apparatus 530. In the first resin coating apparatus 530, a first resin is coated onto a rear surface of the TCP and then cured. After the steps of the first module process line are finished, the liquid crystal panel 310 including the TCP 316 is sealed in a transferring means such as a clean box and the transferring means including the liquid crystal panel 310 is transferred to a second module process line 600 through atmospheric circumstances. The first resin is coated onto the rear surface of the TCP 316 to protect and prevent the TCP 316 from damage and contamination while the liquid crystal panel 310 including the TCP 316 is transferred through the atmospheric circumstances.

Next, the liquid crystal panel 310 having the TCP 316 is transferred to a second resin coating apparatus 540. In the second resin coating apparatus 540, a second resin is coated onto connection portions of the liquid crystal panel 310 and the TCP 316 and then cured to strengthen connection of the liquid crystal panel 310 and the TCP 316. In addition, the second resin is used to protect and prevent a connection portion of the liquid crystal panel 310 and the TCP 316 from damage and contamination while liquid crystal panel 310 including the TCP 316 is transferred through the atmospheric circumstances.

Next, the liquid crystal panel 310 having the TCP 316 is transferred to a first driving circuit unit inspection apparatus 550 and defects of the TCP 316 such as abnormal attachment and abnormal operation are inspected in the first driving circuit unit inspection apparatus 550. In addition, defects of the liquid crystal panel 310 such as such as an electric shortage or an electric disconnection in the gate line and the data line may also be inspected in the first driving circuit unit inspection apparatus 550.

In a method of fabricating an LCD device 300 according to an embodiment of the present invention, since the TCP 316 is inspected by the first driving circuit unit inspection apparatus 550 of the first module process line 500 independently of the PCB 318 after the TCP 316 is attached in the first module process line 500, the TCP 316 having defects may be replaced or may be repaired before the step of attaching the PCB 318 in the second module process line 600. As a result, process yield for the LCD device 300 is improved and production cost and fabrication time are reduced.

The liquid crystal panel 310 passing the inspection of defects in the first driving circuit unit inspection apparatus 550 is transferred to and stocked in a first unloader 560. The TAB apparatus 520, the first resin coating apparatus 530, the second resin coating apparatus 540, the first driving circuit unit inspection apparatus 550 and the first unloader 560 may be connected to each other by an in-line type, where apparatuses are connected with a connecting means such as a conveyor or a robot arm so that the steps of apparatuses are automatically and sequentially performed without intervention of an operator.

Next, the liquid crystal panel 310 stocked in the first unloader 560 is transferred to an auto clave apparatus 570 and bubbles between the polarizing plate and each of the first and second substrates 312 and 314 are removed with heat and pressure in the auto clave apparatus 570.

Next, the liquid crystal panel 310 is transferred to a horizontal stock apparatus 580. In the horizontal stock apparatus 580, the liquid crystal panel 310 is horizontally inserted into a transferring means (not shown) such as a clean box and the transferring means is hermitically sealed.

In another embodiment, the auto clave apparatus 570 may be omitted or may be constituted in the second module process line 600, and the first unloader 560 and the horizontal stock apparatus 580 may be connected to each other by an in-line type using a connecting means such as a conveyor or a robot arm for automatic sequential performance of the corresponding steps.

A width and a pitch of the pad of the liquid crystal panel 310 for the first pad of the TCP 316 are greater than a width of fine patterns formed through the panel process line 400 and are smaller than a width and a pitch of a pad of the PCB 318 for a second pad of the TCP 316. Accordingly, the first module process line 500 where the TAB apparatus 520 is constituted has a medium degree of cleanliness lower than the first degree of cleanliness as the second degree of cleanliness. For example, the second degree of cleanliness may be a degree of cleanliness within a range of class 1000 to class 10000.

Next, the transferring means including the liquid crystal panel 310 is transferred to a loader 610 of the second module process line 600 through atmospheric circumstances and stocked in the loader 610. In the loader 610, the transferring means is unsealed and the liquid crystal panel 310 is extracted from the transferring means.

Next, the liquid crystal panel 310 is transferred to a PCB bonding apparatus 620, and the TCP 316 attached to the liquid crystal panel 310 is attached to the PCB 318 in the PCB bonding apparatus 620. For example, after the ACF is disposed on the pad of the PCB 318 and a second pad (not shown) of the TCP 316 is disposed on the ACF such that the second pad of the TCP 316 is aligned to the pad of the PCB 318, the TCP 316, the ACF and the PCB 318 are pre-attached with a lower pressure and a lower temperature. Then, the TCP 316, the ACF and the PCB 318 are attached to each other with a higher pressure and a higher temperature, thereby the step of attaching the TCP 316 to the PCB 318 in the PCB bonding apparatus 620 completed. The first and second pads may be disposed at end portions of the TCP 316, respectively.

Next, the liquid crystal panel 310 having the TCP 316 and the PCB 318 is transferred to a second driving circuit unit inspection apparatus 630 and defects of the PCB 318 such as abnormal attachment and abnormal operation are inspected in the second driving circuit unit inspection apparatus 630. When defects of the PCB 318 are inspected, the PCB 318 having defects may be replaced or may be repaired before the liquid crystal panel 310 is transferred to a subsequent apparatus. In addition, defects of the TCP 316 may also be inspected in the second driving circuit unit inspection apparatus 630. Further, since the PCB 318 includes circuits generating the RGB data and the plurality of control signals using an image signal from an external system, defects in image display such as a flicker as well as defects in operation of the PCB 318 and the TCP 316 may be inspected in the second driving circuit unit inspection apparatus 630.

The liquid crystal panel 310 passing the inspection of defects in the second driving circuit unit inspection apparatus 630 is transferred to a second unloader 640. The loader 610, the PCB bonding apparatus 620, the second driving circuit unit inspection apparatus 630 and the second unloader 640 may be connected to each other by an in-line type using a connecting means such as a conveyor or a robot arm for automatic sequential performance of the corresponding steps.

The liquid crystal panel 310 stocked in the second unloader 640 is transferred to a frame assembly apparatus 650, and the liquid crystal panel 310, the driving circuit unit 319 including the TCP 316 and the PCB 318 and the backlight unit 320 are wrapped with the main, top and bottom frames 330, 340 and 350 in the frame assembly apparatus 650, thereby the LCD device 300 completed.

The width and the pitch of the pad of the PCB 318 are greater than the width and the pitch of the pad of the liquid crystal panel 310 for the second pad of the TCP 316. Accordingly, the second module process line 600 where the PCB bonding apparatus 620 is constituted has a lower degree of cleanliness lower than the second degree of cleanliness as the third degree of cleanliness. For example, the third degree of cleanliness may be lower than a degree of cleanliness of class 100000.

In a method of fabricating an LCD device 300 according to an embodiment of the present invention, the liquid crystal panel 310 is fabricated in the panel process line 400 having the first degree of cleanliness, and the polarizing plate and the TCP 316 are attached to the liquid crystal panel 310 in the first module process line 500 having the second degree of cleanliness lower than the first degree of cleanliness. In addition, the PCB 318 is attached to the TCP 316 combined with the liquid crystal panel 310, and the liquid crystal 310 panel including the TCP 316 and the PCB 318 and the backlight unit 320 are assembled with the main, top and bottom frames 330, 340 and 350 in the second module process line 600 having the third degree of cleanliness lower than the second degree of cleanliness. Since the steps for the module process are separately performed in the first and second module process lines 500 and 600 having different degrees of cleanliness from each other, production cost and fabrication time are reduced.

Figure 5A:
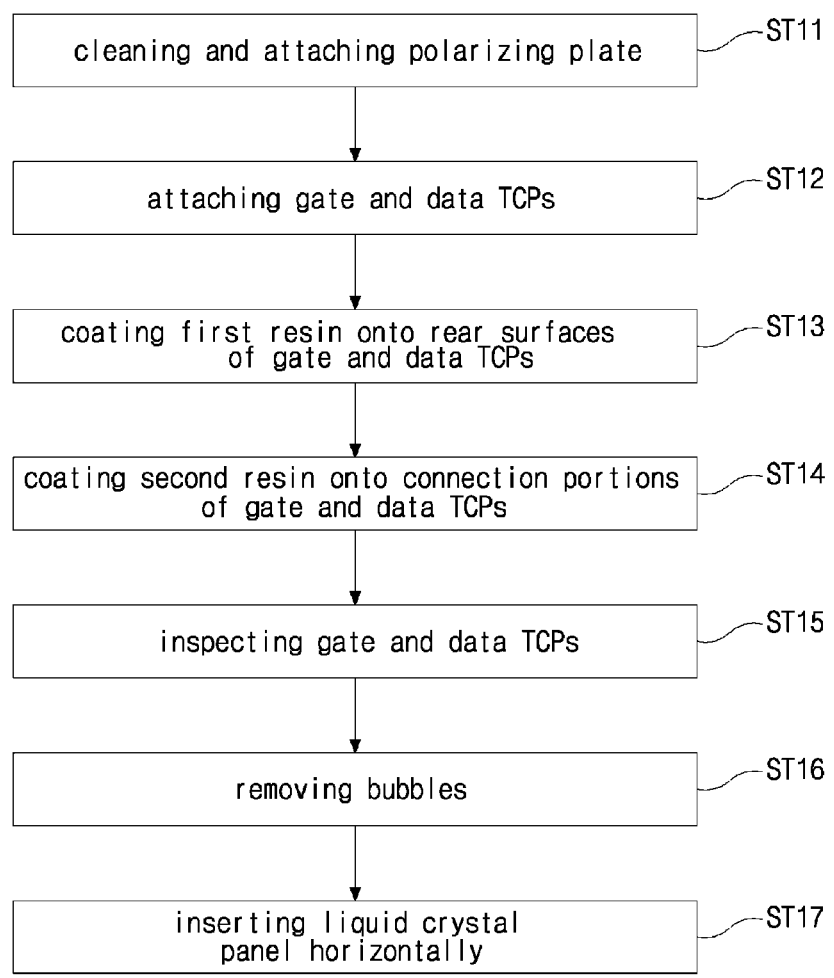
FIG. 5A is a flow chart showing steps performed in a first module process line according to an embodiment of the present invention.
Figure 5B:
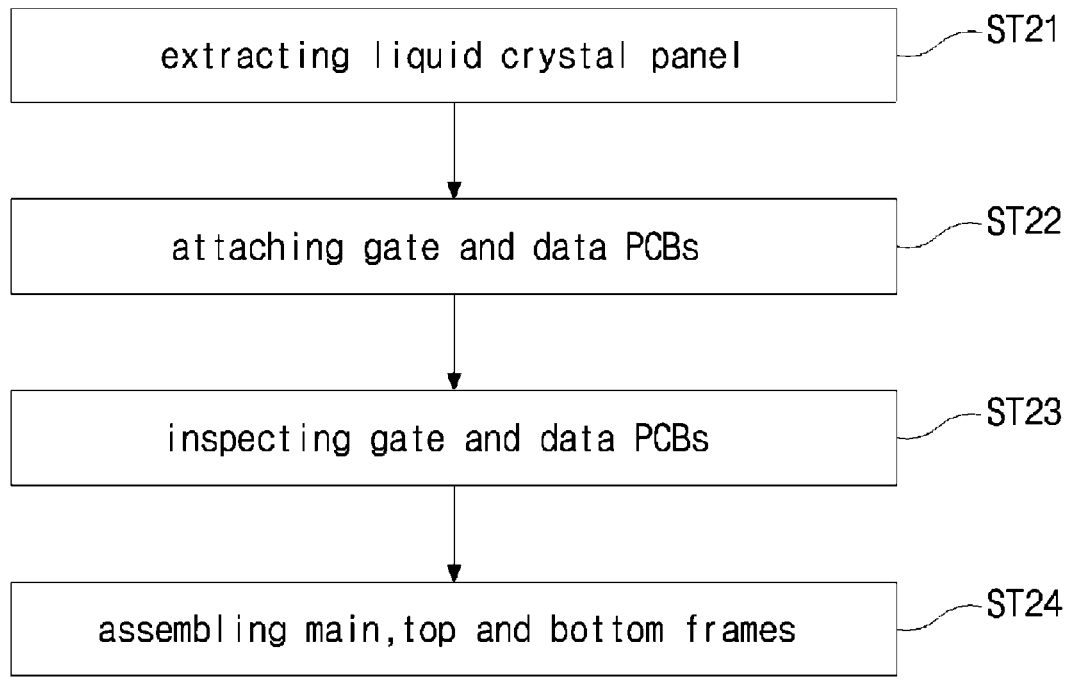
FIG. 5B is a flow chart showing steps performed in a second module process line according to an embodiment of the present invention.

FIGS. 5A and 5B are flow charts showing steps performed in first and second module process lines, respectively, according to an embodiment of the present invention.

At step ST11 of FIG. 5A, a liquid crystal panel 310 (of FIG. 3) is cleaned and a polarizing plate is attached to an outer surfaces of the liquid crystal panel 130 in a first module process line 500 (of FIG. 4) having a second degree of cleanliness.

At step ST12 of FIG. 5A, first pads of gate and data tape carrier packages (TCPs) 316a and 316b (of FIG. 3) are attached to pads of the liquid crystal panel 310 using an anisotropic conductive film (ACF) interposed between the first pads of the gate and data TCPs 316a and 316b and the pads of the liquid crystal panel 310.

A first resin is coated onto rear surfaces of the gate and data TCPs 316a and 316b at step of ST13 of FIG. 5A, and a second resin is coated onto connection portions of the liquid crystal panel 310 and each of the gate and data TCPs 316a and 316b at step of ST14 of FIG. 5A. The first and second resins may be cured in a subsequent step.

At step ST15 of FIG. 5A, defects of the gate and data TCPs 316a and 316b and the liquid crystal panel 310 are inspected by applying signals to the gate and data TCPs 316a and 316b connected to the liquid crystal panel 310.

The steps of ST12 to ST16 may be performed in a plurality of apparatuses connected in an in-line type. For example, the steps of ST12 to ST16 may be performed automatically and sequentially without intervention of an operator, thereby process efficiency improved.

Bubbles existing between the polarizing plate and the liquid crystal panel 310 are removed at step ST16 of FIG. 5A, and the liquid crystal panel 310 is horizontally inserted into a transferring means such as a clean box and the transferring means is hermitically sealed at step ST17 of FIG. 5A.

In addition, at step ST21 of FIG. 5B, the liquid crystal panel 310 is extracted from the transferring means in a second module process line 600 (of FIG. 4) having a third degree of cleanliness lower than the second degree of cleanliness.

At step ST22 of FIG. 5B, second pads of the gate and pad TCPs 316a and 316b are attached to pads of gate and data printed circuit boards (PCBs) 318a and 318b, respectively, using an ACF interposed between the second pads of the gate and pad TCPs 316a and 316b and the pads of the gate and data PCBs 318a and 318b.

At step ST23 of FIG. 5B, defects of the gate and data PCBs 318a and 318b, the gate and data TCPs 316a and 316b and the liquid crystal panel 310 are inspected by applying signals to the gate and data PCBs 318a and 318b connected to the liquid crystal panel 310 through the gate and data TCPs 316a and 316b.

The steps of ST21 to ST23 may be performed in a plurality of apparatuses connected in an in-line type. For example, the steps of ST21 to ST23 may be performed automatically and sequentially without intervention of an operator, thereby process efficiency improved.

At step ST24 of FIG. 5B, the liquid crystal panel 310, the driving circuit unit 319 including the gate and data TCPs 316a and 316b and the gate and data PCBs 318a and 318b and a backlight unit 320 (of FIG. 3) are wrapped and assembled with main, top and bottom frames 330, 340 and 350 (of FIG. 3), thereby the LCD device 300 (of FIG. 3) completed.

Consequently, in a method of fabricating a liquid crystal display device according to an embodiment of the present invention, the polarizing plate and the TCP 316 are attached to the liquid crystal panel 310 in the first module line 500 having the second degree of cleanliness, and the TCP 316 connected to the liquid crystal panel 310 is attached to the PCB 318 in the second module process line 600 having the third degree of cleanliness lower than the second degree of cleanliness. In addition, the liquid crystal panel 310, the driving circuit unit 319 including the TCP 316 and the PCB 318 and the backlight unit 320 are combined by the main, top and bottom frames 330, 340 and 350 in the second module process line. Since the steps for the module process are separately performed in the first and second module process lines 500 and 600, respectively, on the basis of optimum degrees of cleanliness, production cost and fabrication time are reduced.

Further, since the steps of attaching TCP 316, coating first and second resins and inspecting the TCP 316 in the first module process line 500 and the steps of attaching the PCB 318 and inspecting the PCB 318 in the second module process line 600 are performed in a plurality of apparatuses connected in an in-line type, fabrication time is reduced and process efficiency is improved.

Moreover, since the liquid crystal panel 310 is transferred from the first module process line 550 to the second module process line 600 using a transferring means, contamination of the liquid crystal panel 310 is prevented and process yield is improved.

It will be apparent to those skilled in the art that various modifications and variations can be made in a method of fabricating a liquid crystal display device of embodiments of the invention without departing from the spirit or scope of the invention. Thus, it is intended that embodiments of the invention cover the modifications and variations of this invention provided they come within the scope of the appended claims and their equivalents.

What is claimed is:

1. A method of fabricating a liquid crystal display device, the method comprising:
    a first step of attaching a polarizing plate to an outer surface of a liquid crystal panel;
    a second step of attaching a tape carrier package (TCP) to the liquid crystal panel;
    a third step of coating a resin onto a rear surface of the TCP and a connection portion of the liquid crystal panel and the TCP;
    a fourth step of inspecting the TCP and the liquid crystal display panel;
    a fifth step of inserting the liquid crystal panel into a clean box;
    a sixth step of transferring the clean box;
    a seventh step of extracting the liquid crystal panel from the clean box;
    a eighth step of attaching the TCP to a printed circuit board (PCB);
    a ninth step of inspecting the PCB, the TCP and the liquid crystal panel;
    a tenth step of assembling the liquid crystal panel and a backlight unit with a plurality of frames;
    an eleventh step of forming the liquid crystal panel; and
    a twelfth step of inspecting the liquid crystal panel before the first step,
    wherein the first to fifth steps are performed in a first module process line having a first degree of cleanliness,
    wherein the sixth to tenth steps are performed in a second module process line having a second degree of cleanliness lower than the first degree of cleanliness, and
    wherein the eleventh and twelfth steps are performed in a panel process line having a third degree of cleanliness higher than the first degree of cleanliness.

2. The method according to claim 1, wherein the first to fourth steps are performed automatically and sequentially in a first plurality of apparatuses connected in an in-line type using a connecting means.

3. The method according to claim 2, further comprising a step of stocking the liquid crystal panel in a first unloader connected to an end of the first plurality of apparatuses between the fourth and fifth steps.

4. The method according to claim 1, wherein the seventh to ninth steps are performed automatically and sequentially in a second plurality of apparatuses connected in an in-line type using a connecting means.

5. The method according to claim 4, further comprising a step of stocking the clean box including the liquid crystal panel in a loader connected to a front of the second plurality of apparatuses between the sixth and seventh steps.

6. The method according to claim 4, further comprising a step of stocking the liquid crystal panel in a second unloader connected to an end of the second plurality of apparatuses between the fourth and fifth steps.

7. The method according to claim 1, wherein the clean box is transferred through atmospheric circumstances.

8. The method according to claim 7, wherein the resin includes a first resin on the rear surface of the TCP and a second resin on the connection portion of the liquid crystal panel and the TCP.

9. The method according to claim 8, wherein the first resin protects and prevents the TCP from damage and contamination while the clean box is transferred through the atmospheric circumstances.

10. The method according to claim 8, wherein the second resin strengthens the connection portion of the liquid crystal panel and the TCP, and protects and prevents the connection portion of the liquid crystal panel and the TCP from damage and contamination while the clean box is transferred through the atmospheric circumstances.

11. The method according to claim 1, further comprising a step of removing bubbles between the liquid crystal panel and the polarizing plate between fourth and fifth steps.

12. The method according to claim 1, wherein:
    the first degree of cleanliness is within a range of class 1000 to class 10000;
    the second degree of cleanliness is lower than class 100000; and
    the third degree of cleanliness is higher than class 1000.

* * * * *